United States Patent
Ikuta et al.

(10) Patent No.: US 10,996,402 B2
(45) Date of Patent: May 4, 2021

(54) MULTI-CHANNEL OPTICAL FIBER ROTARY JUNCTION

(71) Applicants: CANON U.S.A., INC., Melville, NY (US); THE GENERAL HOSPITAL CORPORATION, Boston, MA (US)

(72) Inventors: Mitsuhiro Ikuta, Cambridge, MA (US); Dongkyun Kang, Arlington, MA (US); Guillermo J. Tearney, Cambridge, MA (US)

(73) Assignees: Canon U.S.A., Inc., Melville, NY (US); The General Hospital Corporation, Boston, MA (US)

(*) Notice: Subject to any disclaimer, the term of this patent is extended or adjusted under 35 U.S.C. 154(b) by 339 days.

(21) Appl. No.: 16/085,672

(22) PCT Filed: Mar. 22, 2017

(86) PCT No.: PCT/US2017/023581
§ 371 (c)(1),
(2) Date: Sep. 17, 2018

(87) PCT Pub. No.: WO2017/165511
PCT Pub. Date: Sep. 28, 2017

(65) Prior Publication Data
US 2020/0301075 A1 Sep. 24, 2020

Related U.S. Application Data
(60) Provisional application No. 62/312,855, filed on Mar. 24, 2016.

(51) Int. Cl.
*G02B 6/26* (2006.01)
*G02B 6/36* (2006.01)
(Continued)

(52) U.S. Cl.
CPC .............. *G02B 6/3604* (2013.01); *G02B 6/32* (2013.01); *G02B 23/2407* (2013.01)

(58) Field of Classification Search
CPC ..................................................... G02B 6/3604
See application file for complete search history.

(56) References Cited

U.S. PATENT DOCUMENTS 5,271,076 A    12/1993  Ames
5,287,423 A *   2/1994  Anthony .................. G01J 3/08
                                                   385/26
(Continued)

FOREIGN PATENT DOCUMENTS

CN         103995321 A      8/2014
EP           1143274 A2    10/2001
(Continued)

OTHER PUBLICATIONS

Kang, D., et al., "Spectrally-encoded color imaging", Optics Express, Aug. 17, 2009, pp. 15239-15247, vol. 17, No. 17.
(Continued)

*Primary Examiner* — Eric Wong
(74) *Attorney, Agent, or Firm* — Canon U.S.A., Inc., IP Division

(57) ABSTRACT

Exemplary apparatus, systems, methods of making, and methods of using a rotary junction are provided. A rotary junction having multiple channels is provided herein. The rotary junction has a first coupling optic and a second coupling optic where the rotating optical fiber or other waveguide comping from the first coupling optic passes through the second coupling optics.

20 Claims, 10 Drawing Sheets

(51) Int. Cl.
   *G02B 6/32*         (2006.01)
   *G02B 23/24*        (2006.01)

(56) References Cited

U.S. PATENT DOCUMENTS

| | | | |
|---|---|---|---|
| 5,337,734 A | 8/1994 | Saab | |
| 5,347,990 A | 9/1994 | Ebling et al. | |
| 5,371,814 A | 12/1994 | Ames et al. | |
| 5,392,370 A | 2/1995 | Gryk | |
| 5,588,077 A * | 12/1996 | Woodside | G02B 6/32 385/16 |
| 6,773,170 B1 | 8/2004 | Georgiev et al. | |
| 7,366,376 B2 | 4/2008 | Shishkov et al. | |
| 7,515,782 B2 | 4/2009 | Zhang et al. | |
| 7,724,996 B2 | 5/2010 | Popp et al. | |
| 7,843,572 B2 | 11/2010 | Tearney et al. | |
| 8,055,107 B2 | 11/2011 | Masuda | |
| 8,145,018 B2 | 3/2012 | Shishkov et al. | |
| 8,355,607 B2 | 1/2013 | Zhang et al. | |
| 8,380,024 B1 * | 2/2013 | Zhang | G02B 6/3604 385/26 |
| 8,384,909 B2 | 2/2013 | Yun et al. | |
| 8,660,389 B2 * | 2/2014 | Jono | G02B 6/3604 385/26 |
| 8,679,002 B2 | 3/2014 | Sutoh et al. | |
| 8,909,008 B1 | 12/2014 | Tzeng et al. | |
| 8,928,889 B2 | 1/2015 | Tearney et al. | |
| 8,953,911 B1 | 2/2015 | Xu et al. | |
| 9,086,533 B1 | 7/2015 | Wach | |
| 9,087,368 B2 | 7/2015 | Tearney et al. | |
| 9,332,942 B2 | 5/2016 | Jaffer et al. | |
| 9,557,154 B2 | 1/2017 | Tearney et al. | |
| 9,968,261 B2 | 5/2018 | Motafakker-Fard | |
| 2002/0146227 A1 | 10/2002 | Suzuki et al. | |
| 2007/0019908 A1 | 1/2007 | O'Brien | |
| 2007/0217736 A1 | 9/2007 | Zhang et al. | |
| 2008/0175535 A1 | 7/2008 | Popp et al. | |
| 2008/0175536 A1 | 7/2008 | Krumme | |
| 2009/0027689 A1 | 1/2009 | Yun et al. | |
| 2009/0310911 A1 | 12/2009 | Zhang et al. | |
| 2010/0092389 A1 | 4/2010 | Jaffer | |
| 2011/0164846 A1 | 7/2011 | Zhang et al. | |
| 2011/0292400 A1 | 12/2011 | Fleming et al. | |
| 2012/0148189 A1 | 6/2012 | Zhang et al. | |
| 2013/0206967 A1 | 8/2013 | Shpunt et al. | |
| 2013/0223798 A1 * | 8/2013 | Jenner | G02B 6/3604 385/77 |
| 2016/0341951 A1 | 11/2016 | Tearney et al. | |
| 2017/0035281 A1 | 2/2017 | Takeuchi et al. | |
| 2017/0135584 A1 | 5/2017 | Tearney et al. | |
| 2017/0167861 A1 | 6/2017 | Chen et al. | |
| 2017/0168232 A1 | 6/2017 | Tearney et al. | |
| 2017/0176736 A1 | 6/2017 | Yamamoto et al. | |
| 2017/0209049 A1 | 7/2017 | Wang et al. | |
| 2017/0322079 A1 | 11/2017 | Do et al. | |

FOREIGN PATENT DOCUMENTS

| | | |
|---|---|---|
| JP | 05160492 A | 6/1993 |
| JP | 2001-296485 A | 10/2001 |
| WO | 2001/16635 A1 | 3/2001 |
| WO | 2015/116951 A2 | 8/2015 |
| WO | 2015117241 A1 | 8/2015 |
| WO | 2017/024145 A1 | 2/2017 |
| WO | 2017/117203 A1 | 7/2017 |
| WO | 2017/139657 A1 | 8/2017 |

OTHER PUBLICATIONS

Zeidan, A et al. "Miniature forward-viewing spectrally encoded endoscopic probe", Optics Letters, Aug. 15, 2014, pp. 4871-4874, vol. 39, Issue 16.

Yelin, D., et al., "Three-dimensional miniature endoscopy", Nature, Oct. 19, 2006, p. 765, vol. 443.

Kang, D., et al., "Minature grating for spectrally-encoded endoscopy", Lab Chip, 2013, pp. 1810-1816, vol. 13.

* cited by examiner

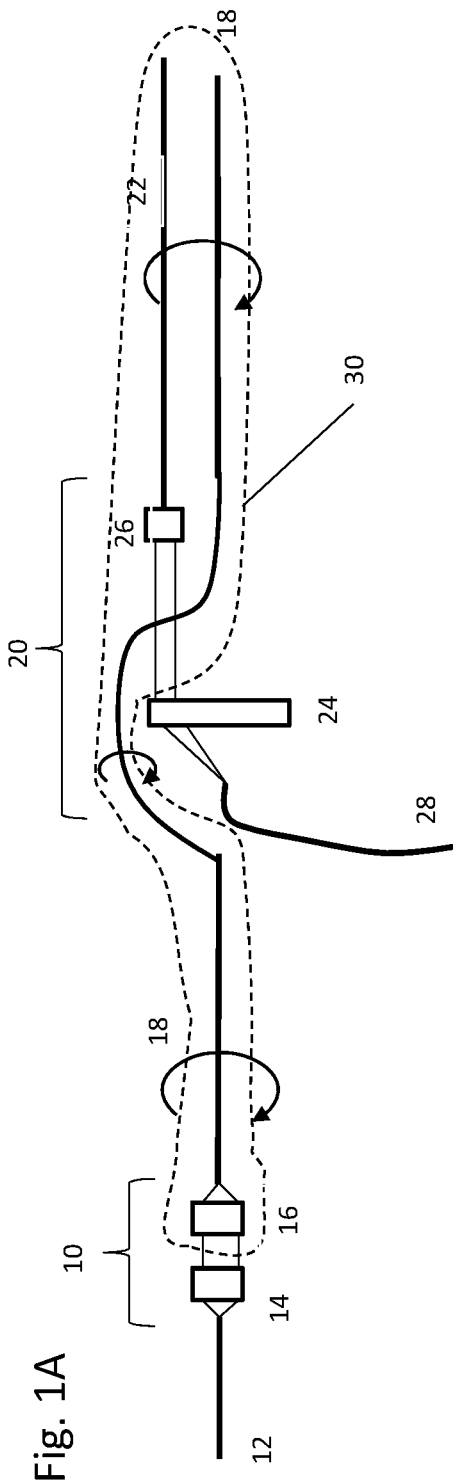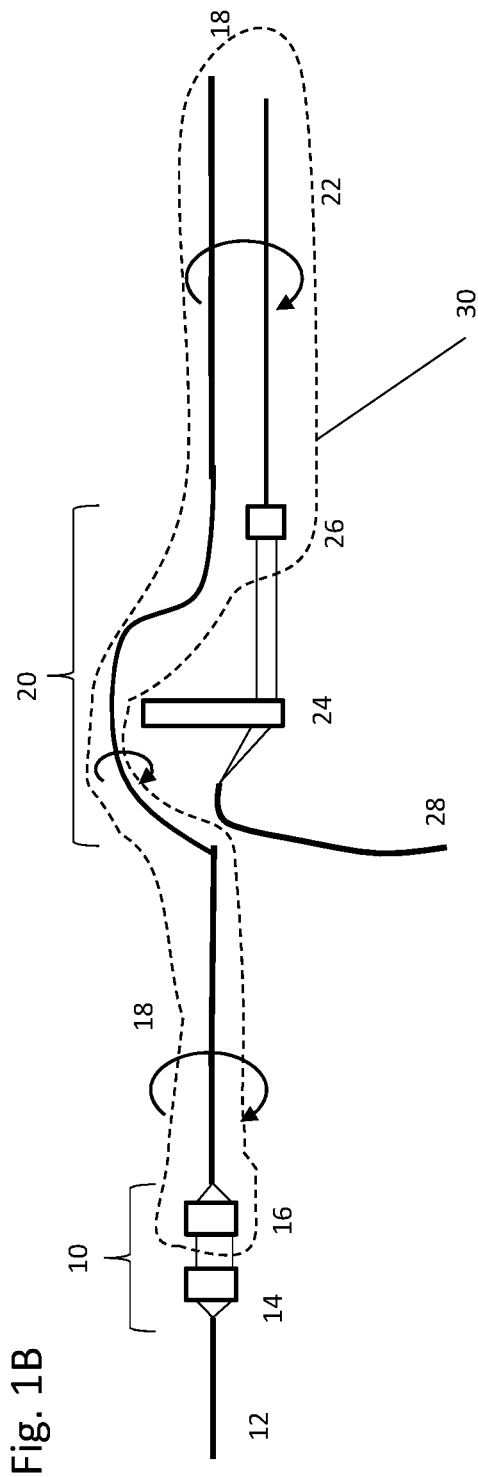
Fig. 1A
Fig. 1B

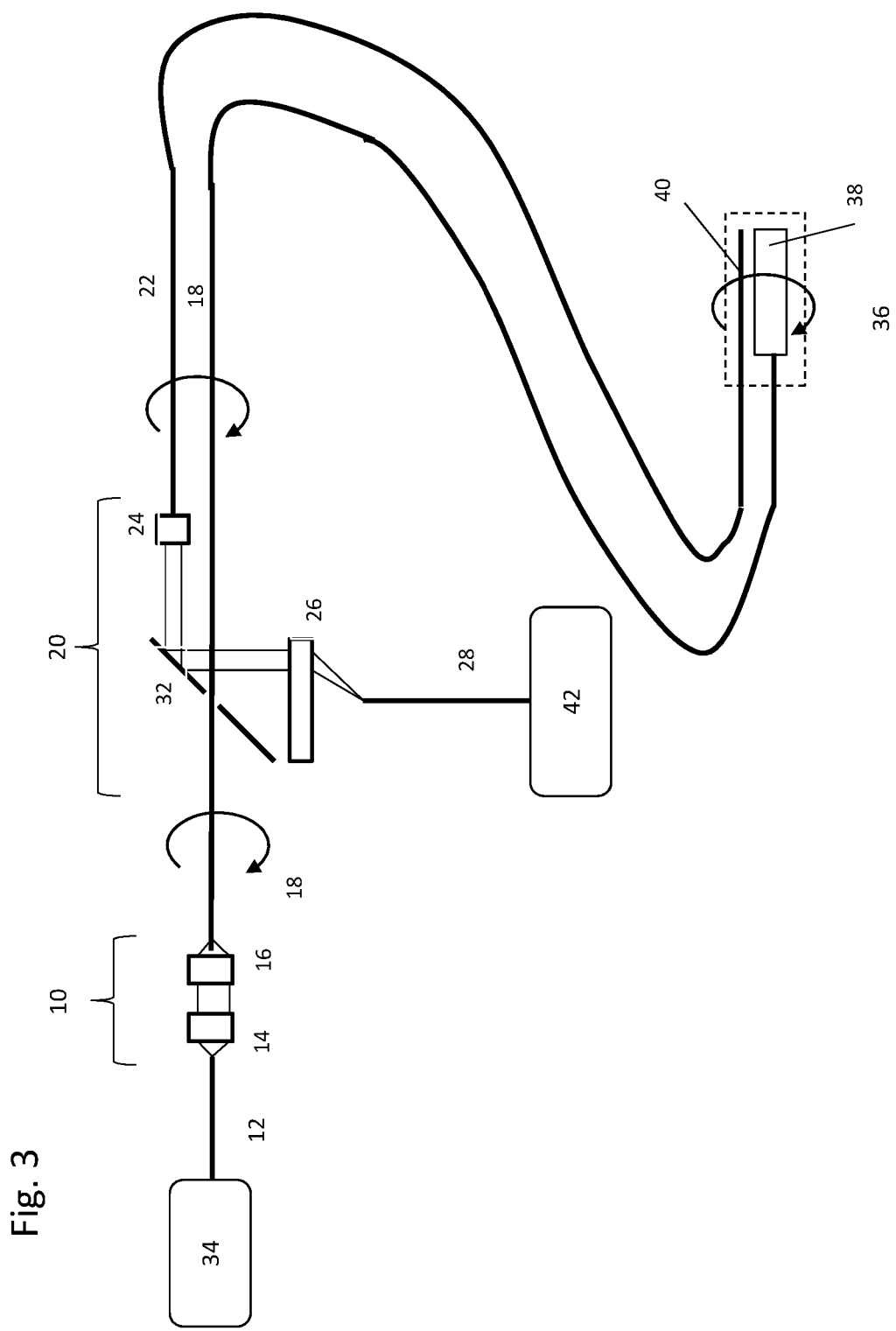

MULTI-CHANNEL OPTICAL FIBER ROTARY JUNCTION

CROSS-REFERENCE TO RELATED APPLICATION(S)

This application claims priority to U.S. Provisional Application Ser. No. 62/312,855 filed 24 Mar. 2016, the content of which is incorporated herein by reference in its entirety.

FIELD OF THE DISCLOSURE

The present disclosure relates generally to optical imaging and more particularly to optical rotary junction devices, exemplary apparatus and methods which use the rotary junction for imaging. More particularly, the disclosure exemplifies multi-channel rotary junctions.

BACKGROUND INFORMATION

Optical fiber rotary junctions are known for transmission of optical signals between fibers that are rotatable relative to each other. This allows, for example, a stationary light source and detection system combined with a rotating sampling probe. Some applications need two or multiple channel rotary junction. For example, one channel is needed for one type of incident radiation and a second channel is needed for a second type of incident radiation.

In the two or multiple junctions, light from fibers on the stationary side is collimated and coupled into fibers on the rotor side through rotational optics, such as prisms, mirrors, or lenses. Dove prisms are by far the most common as rotational optics in the two or multiple channel rotary junctions. For example, U.S. Pat. No. 5,371,814 discloses an optical rotary joint for a plurality of channels, using a Dove prism.

In reality, coupling efficiency between fibers is not 100%, especially in the case that the fibers are single-mode fibers. In multi-channel rotary junctions there is also a high probability of optical crosstalk, i.e. some part of light from a fiber can be coupled into not only the counter fiber of the same channel but also another fiber of different channel.

Some applications require almost zero-level crosstalk. For example, spectrally-encoded endoscopy is known that it can achieve ultraminiature endoscope. In this endoscope, two fibers can be used, where one fiber is used for illumination fiber and the other for detection. The two fibers can be rotated continuously by a multi-channel rotary junction. If there is non-negligible optical crosstalk between the fibers in this rotary junction, i.e. illumination light directly couples into the detection fiber, it increases the background signal in the detection fiber and subsequently degrades the image quality.

Thus, there is need for a multi-channel rotary junction that has low or negligible optical crosstalk.

SUMMARY OF EXEMPLARY EMBODIMENTS

According to at least one embodiment of the invention, there is provided a rotary junction comprising: a first coupling optic that comprises a first rotor having a stationary side and a rotating side, a first waveguide on a stationary side of the first rotor and, a second waveguide on the rotating side of the first rotor. The rotary junction also has a second coupling optic that comprises a second rotor having a stationary side and a rotating side, a third waveguide on a stationary side of the second rotor and, a fourth waveguide on the rotating side of the second rotor. The second fiber passes through the second coupling optics. In some embodiments, the some or all of the waveguides are optical fibers, such as single mode fibers and/or multi-mode fibers.

The rotary junction as described herein is particularly advantageous since the optical crosstalk, such as the crosstalk between the second and fourth fiber is low. For example, the optical crosstalk may be less than −60 dB.

In some embodiments, there is provided a rotary junction comprising at least two channels, where each channel comprises a coupling optic and a rotor. The second (and subsequent) channels are each adapted such that an optical waveguide caused to rotate by the first (or prior) channel passes through or traverses the second (or subsequent) channel. The rotation of this optical waveguide is not substantially changed or altered by the second (or subsequent) channel. In some embodiments, the optical waveguide passes through the center of the second channel.

In other embodiments, there is provided an imaging apparatus that comprises the rotary junction as described herein and a probe that is detachably attached to the rotary junction. This probe may be sized and otherwise adapted and configured for in vivo use.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

FIG. 1A is a diagram of an embodiment showing a two-channel optical fiber rotary junction with two coupling optics.

FIG. 1B is a diagram of another embodiment showing a two-channel optical fiber rotary junction with two coupling optics.

FIG. 3 is a diagram of an embodiment showing a SEE system including a two-channel optical fiber rotary junction with two coupling optics.

Figures 2A, 2B:
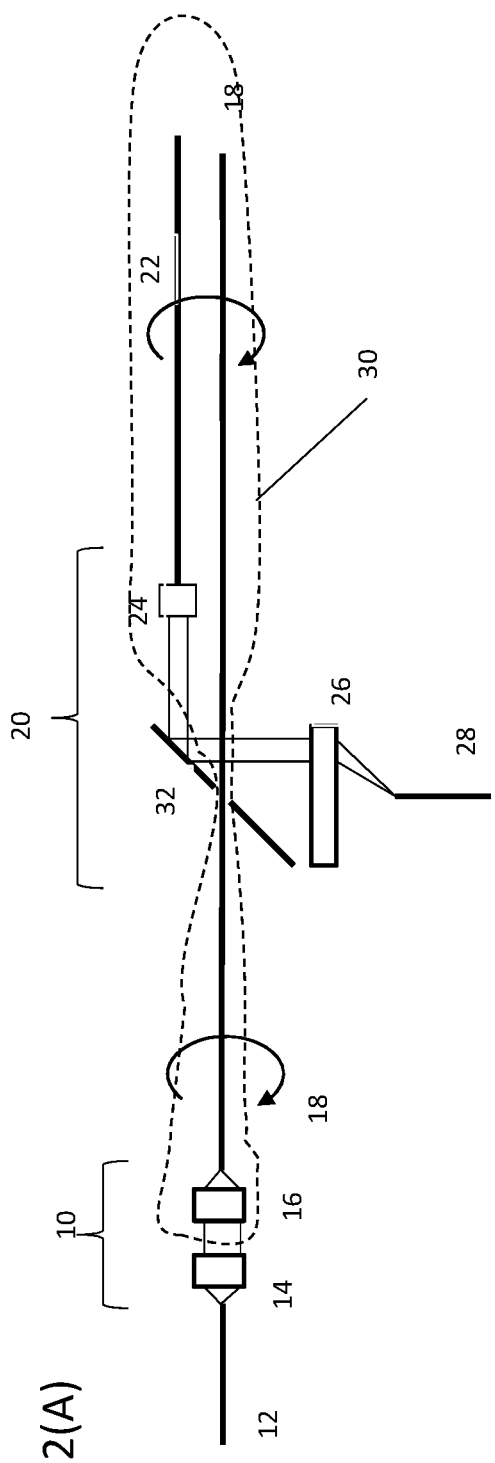
FIG. 2A is a diagram of a different embodiment showing a two-channel optical fiber rotary junction with two coupling optics.
FIG. 2B is a diagram of another embodiment showing a two-channel optical fiber rotary junction with two coupling optics.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

The embodiments are based on the object of providing multi-channel optical waveguide rotary junction that has little to no optical crosstalk.

In a first embodiment, shown in FIG. 1, a two-channel optical waveguide rotary junction consists of two coupling optics. One side of the first coupling optics 10 is stationary and the other is rotating. For both the two coupling optics, a stationary optical waveguide (exemplified herein as an optical fiber, but could be, for example, a rigid waveguide) is aligned for optical communication with a rotating optical waveguide (exemplified herein as an optical fiber, but could be, for example, a rigid waveguide) across a coupling optic, which works as a rotary optical junction.

At the first coupling optics 10, a first light incident on the rotary junction from one stationary waveguide (the first waveguide, 12) on the stationary side is collimated and coupled through two lenses 14, 16 into one rotating waveguide (the second waveguide, 18) on the rotor side. The collimation and coupling optics can be, for example lenses, such as GRIN lens or alternatively other collimating or coupling optical components. If the lens on the rotor side 16 is separated from the second waveguide 18, it can be stationary or rotating.

The second coupling optics 20 is located on the rotor side of the first coupling optics 10. One side of the second coupling optics 20 is stationary and the other is rotating. The rotating waveguide (the second waveguide, 18) from the first coupling optics 10 traverses the second coupling optics 20 at the center of the rotation of the second coupling optics. Thus, the second waveguide passes through the second coupling optic from the stationary side to the rotating side.

In the second coupling optics 20, a second light that passes into the rotary junction from another rotating waveguide (the third waveguide, 22) on the rotor side of the second coupling optics 20 is collimated by a lens 24 which is also rotating with the third waveguide 22, and is coupled into another stationary waveguide (the forth waveguide 28) on the stationary side of the second coupling optics. The collimation and coupling optics 24, 26 can be lenses, such as GRIN lens.

Figure 10:
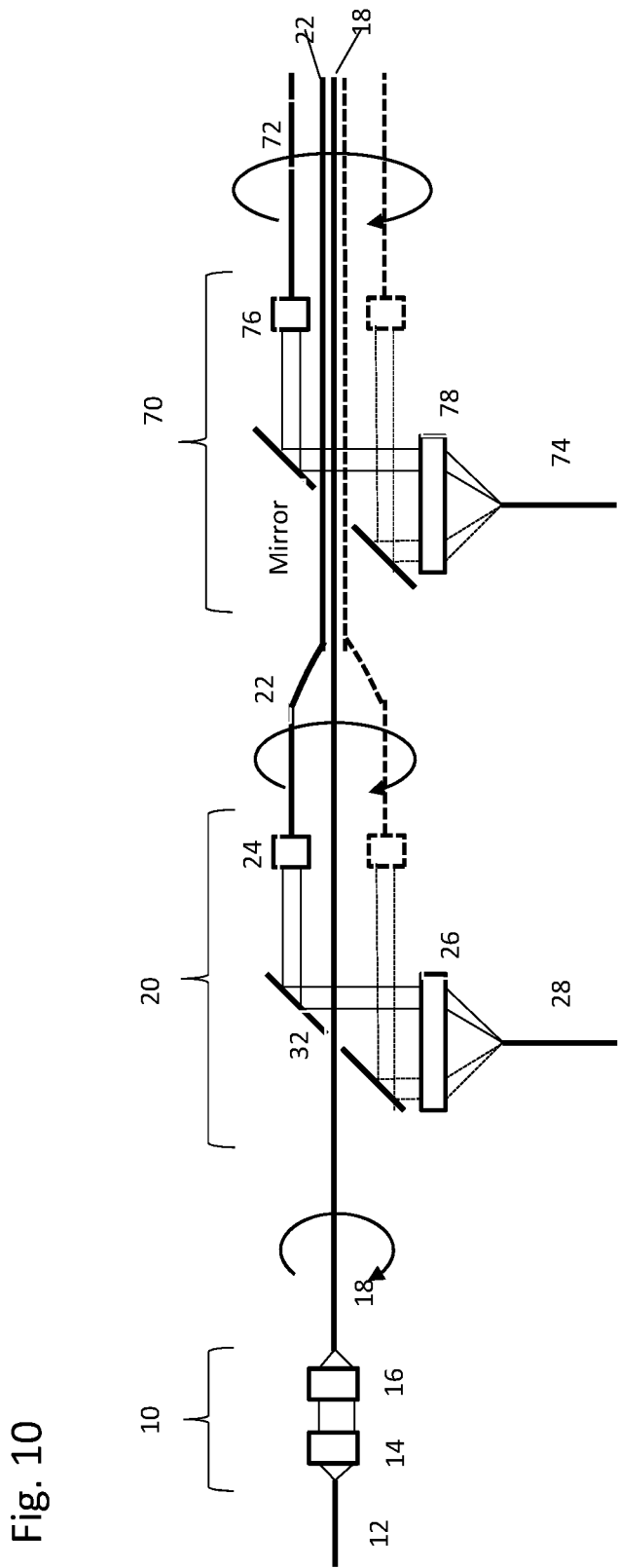
FIG. 10 is a diagram of an embodiment showing a three-channel optical fiber rotary junction with two coupling optics.

In use, the third waveguide rotates 22 around the second waveguide 18. The rotating parts of the rotary junction of FIG. 10A are identified by a dashed line 30.

In some embodiments, the rotation of the first coupling optics and that of the second coupling optics are synchronized. This synchronization can be accomplished by, for example, using one motor for the two coupling optics. It can also be made by using encoders to measure the rotation and controlling the motor for each coupling optic from the encoder feedback.

FIG. 1A shows schematic of 2-channel rotary junction of this embodiment. FIG. 1B shows schematic of the 2-channel rotary junction after 180 degree rotation from that in FIG. 1A.

The first light is waveguided in the second waveguide 18 in the second coupling optics 20 where the second light is collimated. That means that, theoretically, there is no optical crosstalk between the two lights.

In some exemplary embodiments, it is preferred to make the diameter of the second waveguide smaller than the diameter of collimated light from the third waveguide to minimize the scattering loss due to the second waveguide/the waveguide.

In some embodiments, each channel can be aligned in each coupling optic separately to maximize coupling efficiency. That is easier than to align two channels in one coupling optic at the same time.

In another embodiment (FIG. 2), the second coupling optics 20 can have a mirror 32 to bend the path of the second light. The mirror 32 can have a hole and the second waveguide 18 goes through the hole. This configuration makes it easy to place the waveguides and the collimating/coupling optics.

FIG. 2A shows schematic of 2-channel rotary junction of this embodiment. FIG. 2B shows schematic of the 2-channel rotary junction after 180 degree rotation from that in FIG. 2A.

An exemplary application, which is spectrally-encoded endoscopy (SEE), is provided in FIG. 3. In this example, the first and second waveguides 12, 20 can be single-mode fibers and the third and fourth waveguides 22, 28 are multi-mode fibers. The rotary junction is connected to a SEE probe 36. The proximal end of the first fiber 12 is coupled to source 34 for applications such as endoscopy. The source in this and other embodiments may be a broadband laser, such as a supercontinuum laser. The SEE probe is a spectrally encoded endoscopy probe such as the probe described, for example, in U.S. Pat. No. 8,145,018

The second waveguide 18 and the third waveguide 22 can be used as part of illumination optics 38 and a detection optics 40 of the endoscope, respectively. The light from the second waveguide 18 of the endoscope is spectrally-encoded on a tissue target, and some scattered light from the tissue is detected by the third waveguide 22. The second and the third waveguides have a diffraction grating and rotate together continuously.

In the embodiment of FIG. 3, the other end of the forth waveguide 28 is coupled to a spectrometer 42 which detects and decodes signal light from the tissue. After the spectrometer, the signal may be sent to a computer and/or display (not shown) for further processing and viewing.

Figure 9:
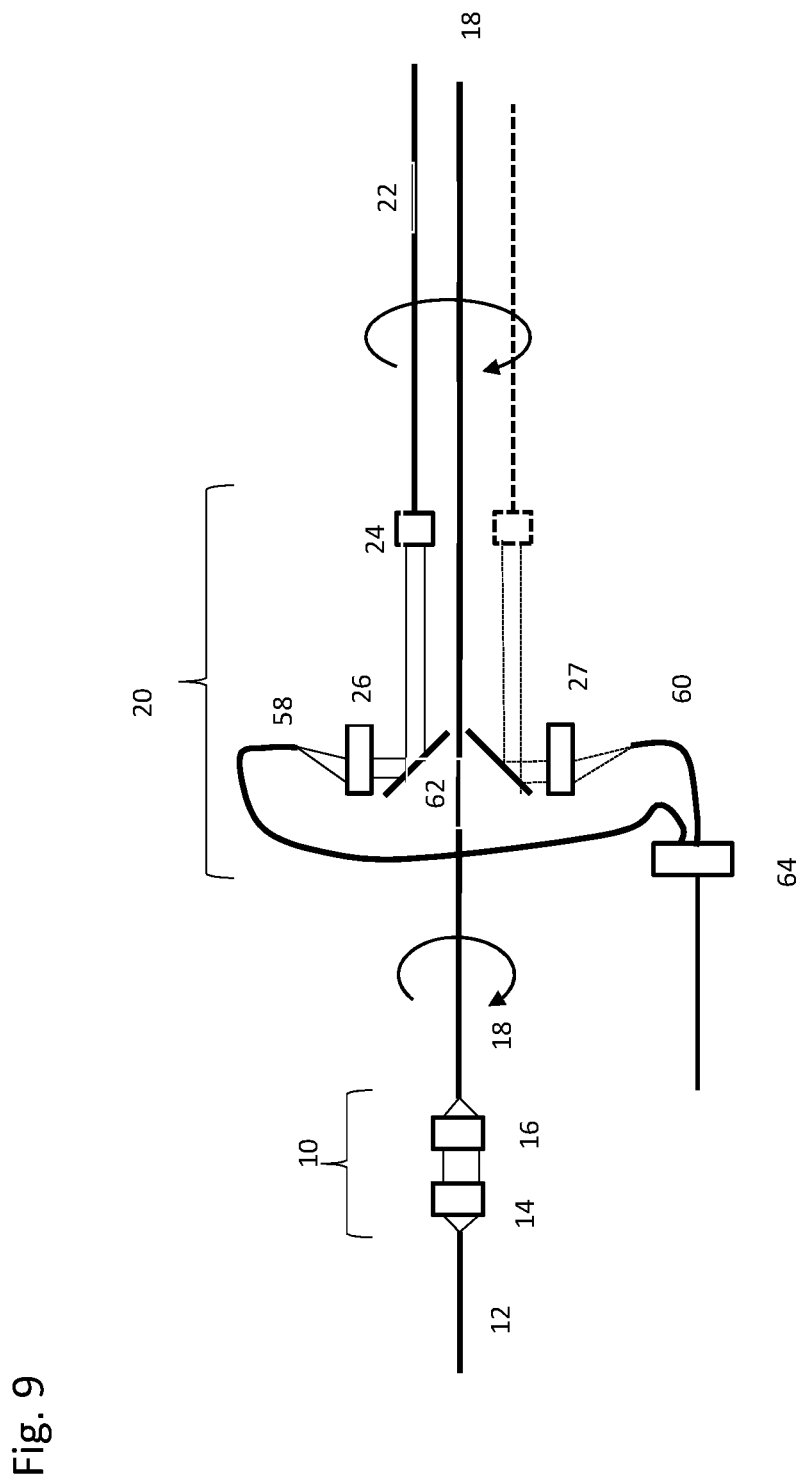
FIG. 9 is a diagram of an embodiment showing a two-channel optical fiber rotary junction with two coupling optics.

In some embodiments, the multi-channel rotary junction as described herein is used for spectrally-encoded endoscopy (SEE) application. This is exemplified by the embodiments shown in FIGS. 4 and 5. The light source for SEE application can be a swept light source 44, which generates light whose wavelength changes time by time. In this case, one photodetector 46 can be used for detection of signal from the tissue. The photodetector 46 can be placed in the second coupling optics 20 without the forth waveguide. Thus, light from lens 26 can optionally be focused onto photodetector 46 directly without the fiber 28. In some embodiments, multiple photodetectors can be used in the second coupling optics so that light from the third waveguide is scattered less by the second waveguide. For example, two photodetector can be placed at the position of fiber 58 and fiber 60 in FIG. 9 instead of using fiber 58 and 60. In rotation of the rotary junction of the embodiment described as FIG. 5, the third waveguide 22 and collimating lens 24 can be seen as dashed lines in a second location. The location shown is after 180 degree rotation from the first location depicted as a solid line.

Figure 6:
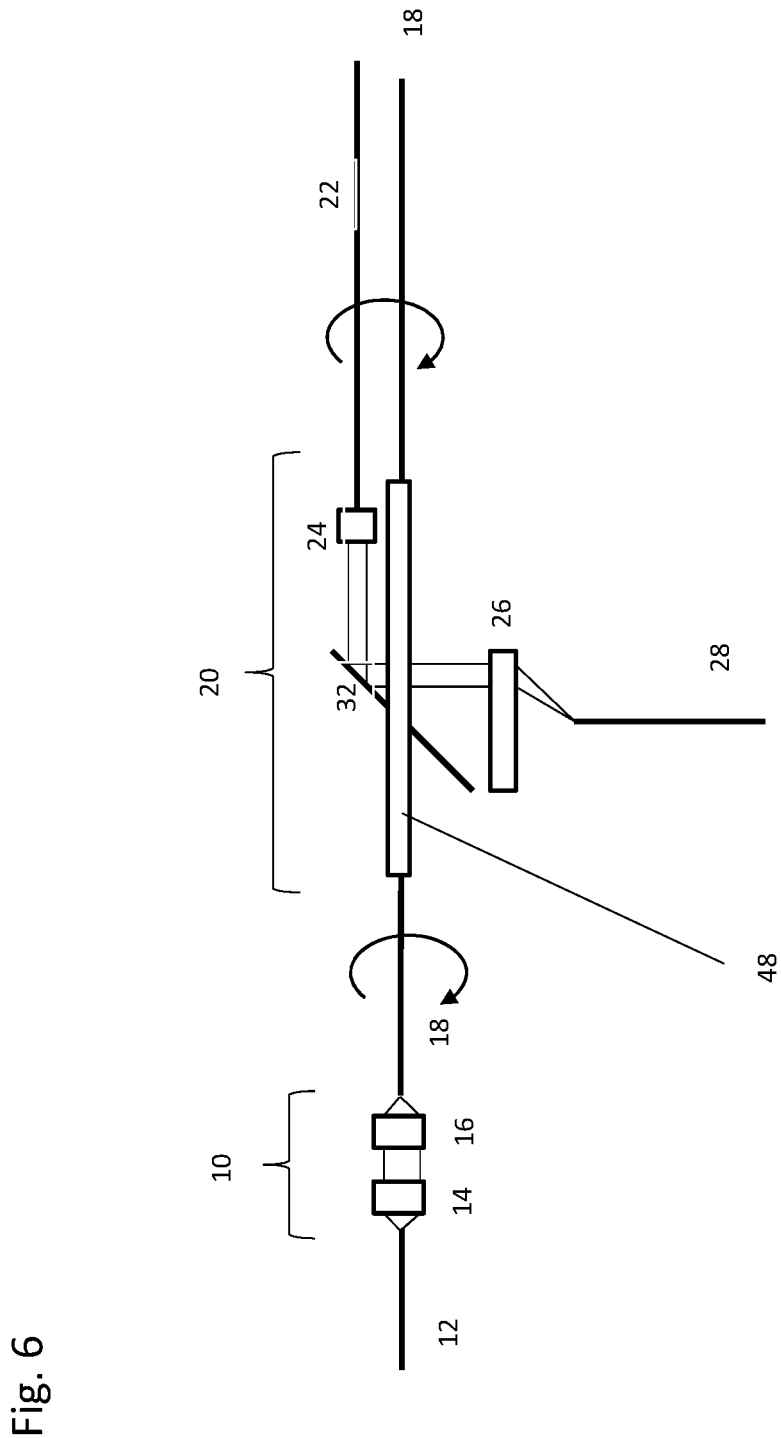
FIG. 6 is a diagram of an embodiment showing a two-channel optical fiber rotary junction with two coupling optics.

In another embodiment of the multichannel rotary guide exemplified by FIG. 6, the second waveguide 18 in the second coupling optics 20 can be sealed by a tubing 48 for protection. A nonlimiting example of such a protective tubing is a stainless steel hypotubing.

Figure 7:
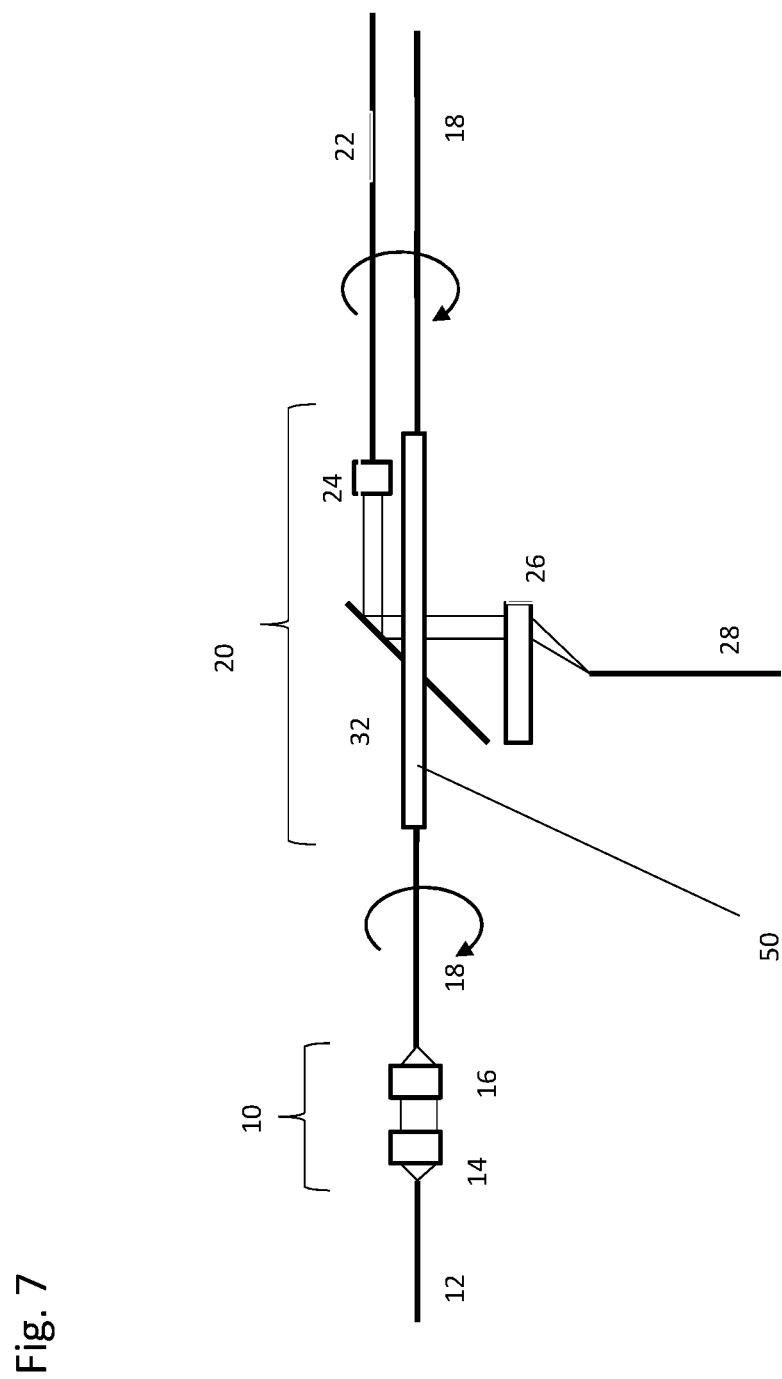
FIG. 7 is a diagram of a different embodiment showing a two-channel optical fiber rotary junction with two coupling optics.

In another embodiment (FIG. 7), the second waveguide 18 in the second coupling optics 20 is replaced with another rotating optical waveguide 50 such as a semiconductor optical waveguide. In other embodiments, the additional rotating optical waveguide 50 is located within and outside of the second coupling optics. Further, in some embodiments, different waveguide(s) can be inserted in the coupling optics (waveguide 50) instead of using the same fiber as fiber 18.

Figure 8A:
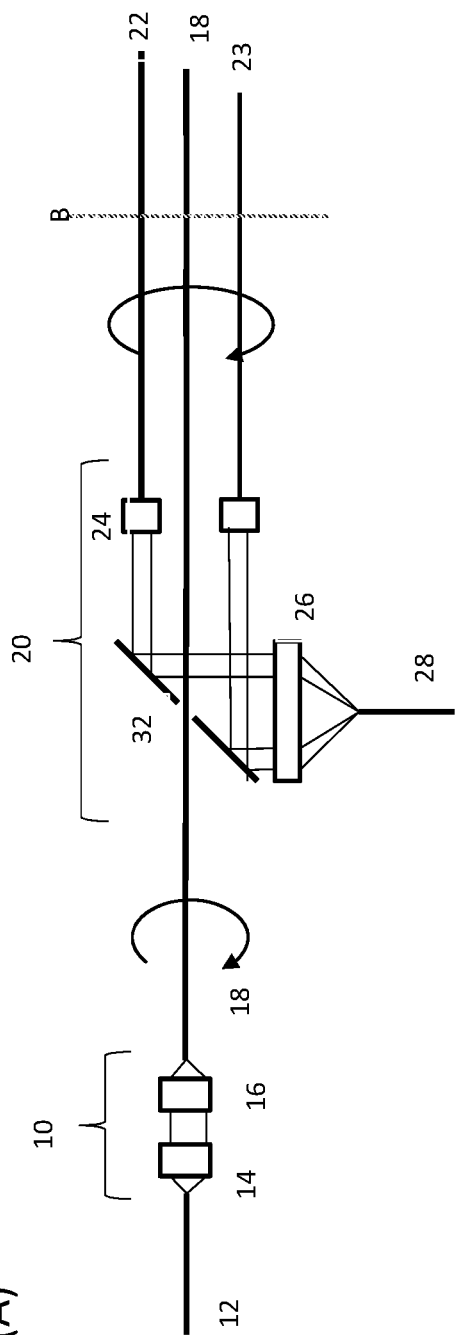
FIG. 8A is a diagram of an embodiment showing a two-channel optical fiber rotary junction with two coupling optics.
Figure 8C:
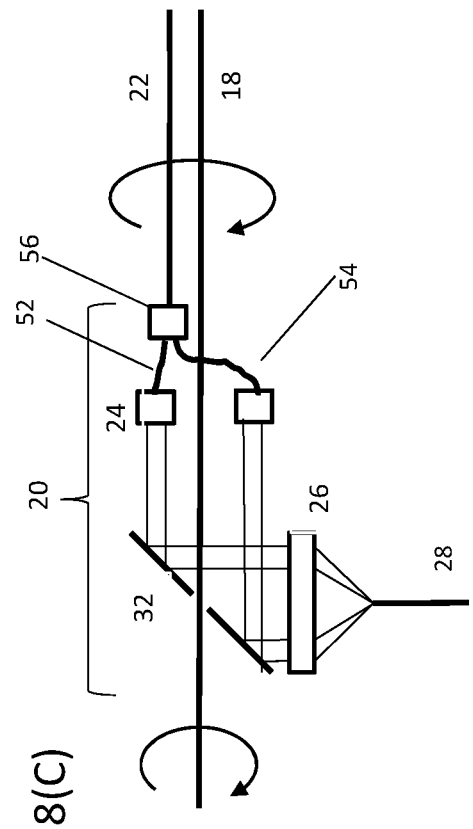
FIG. 8C is a partial diagram of an alteration of the embodiment of FIG. 8A where the second coupling optics comprises a splitter.
Figure 8B:
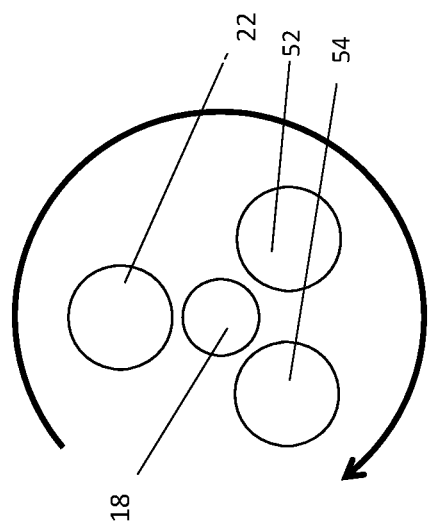
FIG. 8B is a cutout view of the fibers at the dashed line on FIG. 8A.

In another embodiment (FIG. 8), multiple waveguides (52 and 54) can be used to do the same function as the third waveguide in the previous embodiment. The coupling efficiency between the third and the forth waveguides in the second coupling optics can be changed due to the location of the third waveguide, because the second waveguide can scatter some portion of the second light in the second coupling optics. Using multiple waveguides for the third waveguide function can average the variation of coupling efficiency. FIG. 8A shows the rotary junction where the third waveguide 22 is split into two separate waveguides 52, 54 by a splitter 56. FIG. 8B shows the profile of the second waveguide 18 and the third waveguides (22, 52, 54) when 3 waveguides are used as the third waveguides. A waveguide optic splitter 56 can be used with this configuration. An example of that is shown in FIG. 8C.

In another embodiment (FIG. 9), multiple waveguides (58 and 60) can be used to do the same function as the forth waveguide in the previous embodiment. For example, a V-shape mirror, a polygonal pyramid mirror, or similar 62 can be used instead of the plain mirror in the second coupling optics 20. This configuration can decrease the loss due to scattering loss of the second light by the second waveguide. A waveguide optic coupler 64 can be used with this configuration. In rotation of the rotary junction of the embodiment described as FIG. 9, the third waveguide 22 and collimating lens 24 can be seen as dashed lines in a second location. The location shown is after 180 degree rotation from the first location depicted as a solid line.

In another embodiment (FIG. 10), another coupling optics (third coupling optics, 70) can be added to have the third channel. The third coupling optics 70 can be located next to the rotor side of the second coupling optics 20. In this configuration, the second 18 and the third 22 waveguide penetrate the third coupling optics 70 rotating together. The third channel has one waveguide (fifth waveguide, 72) rotating around the second 18 and the third 22 waveguides on the rotor side and another waveguide (sixth waveguide, 74).

As the third coupling optic 70 rotates, the second waveguide 18 remains stationary and the third waveguide 22 rotates around the second waveguide 18. The fifth waveguide 72 rotates around both the third waveguide 22 and the second waveguide 18. The dashed lines depict the rotary junction at a second location that is after 180 degree rotation from the first location depicted as a solid line.

Transmission direction is not limited to the examples in the embodiments above. Transmission from, for example, the second fiber to the first fiber, and the forth fiber to the third fiber are possible embodiments.

It is a particular advantage of the embodiments as provided herein that alignment is not so challenging compared to prior multi-channel rotary junctions since each coupling optic can be aligned separately.

Applications

Figure 4:
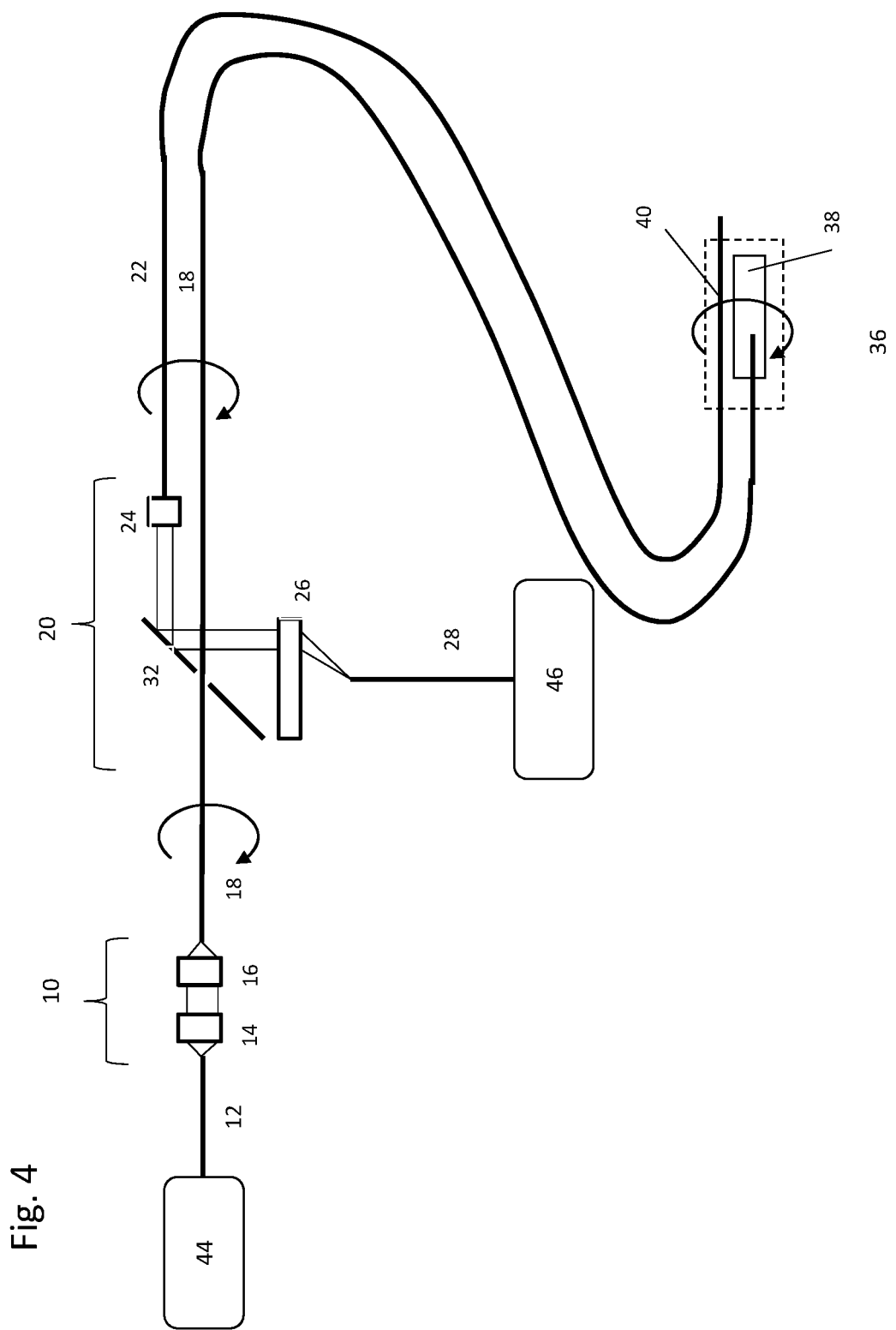
FIG. 4 is a diagram of another embodiment showing a SEE system including a two-channel optical fiber rotary junction with two coupling optics.
Figure 5:
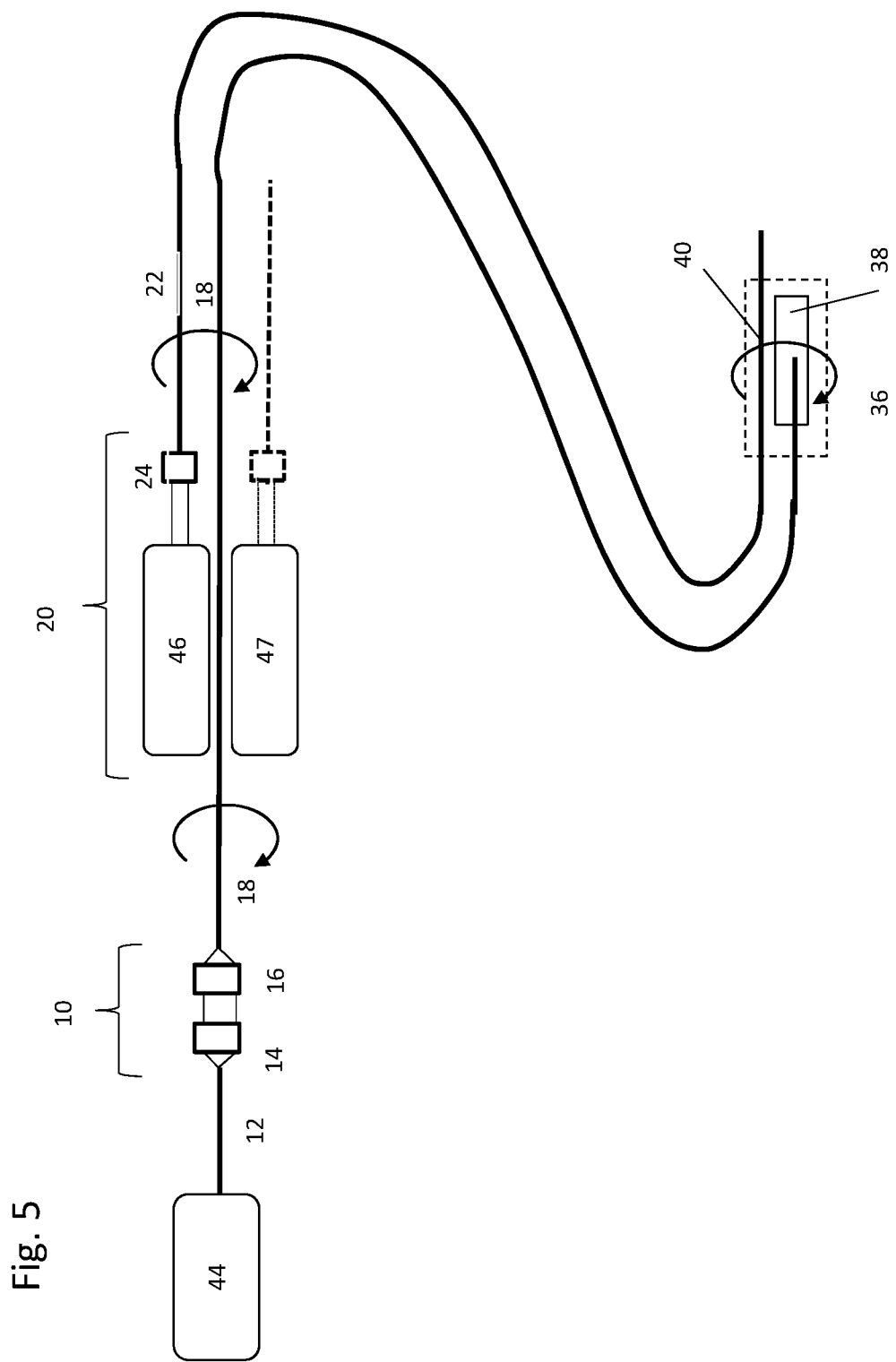
FIG. 5 is a diagram of another embodiment showing a SEE system including a two-channel optical fiber rotary junction with two coupling optics.

As exemplified for SEE in FIGS. 3-5 above, the multi-channel rotary junction as described herein can be used endoscopy. Further, the multi-channel rotary junction according to the exemplary embodiments of the present disclosure can be used with and/or implement any SEE system or color SEE system, and for example with those described in U.S. Pat. Nos. 6,341,036; 7,447,408; 7,551,293; 7,796,270; 7,859,679; 8,045,177; 8,145,018; 8,838,213; U.S. Pat. Pub. No. 2008/0013960; U.S. Pat. Pub. No. 2011/0237892; and International Pub. WO2014/031748, which are herein incorporated by reference in their entirety.

In some exemplary embodiments, the multi-channel rotary junction is used in an optical frequency domain imaging ("OFDI") system which can use the exemplary rotary junction according to the present invention. For example, the light source may be a wavelength swept laser where the rotary junction is connected to the sample arm of an interferometer.

In some exemplary embodiments, the multi-channel rotary junction is used in a spectral-domain optical coherence tomography (SD-OCT") system. For example, a light source which is, for example, a low coherence broadband source, pulsed broadband source, or a wavelength varying source is used in combination with the other components of a SD-OCT system as known in the art.

Indeed, the multi-channel rotary junction according to the exemplary embodiments of the present disclosure can be used with and/or implement any OCT system, OFDI system, SD-OCT system or other imaging systems, and for example with those described in U.S. Pat. Nos. 7,382,949; 7,355,716; 6,831,781; 7,872,759; and U.S. Pat. Pub. 2012/0101374.

In other exemplary embodiments, the multi-channel rotary junction is used for multi-modal analysis, such as a combination of two separate imaging modalities. In one embodiment, the rotary junction is used in an imaging apparatus where two or more different bands of broad band light are spectrally imaged on a single sample. In another embodiment, the rotary junction is used in an imaging apparatus combining OCT and fluorescence.

In some embodiments, the rotary junction is adapted and configured for a light entering the first waveguide and a light entering the third waveguide to both have the same wavelength. In other embodiments, a light entering the first waveguide and a light entering the third waveguide both have the same polarization.

In some embodiments, the applications using the multi-channel rotary junction are in vivo applications, such as use as a diagnostic device inside a body lumen or inside the cardiovascular system. Since one particular advantage of the rotary junction as provided herein is a reduction in crosstalk, this allows the use of optical fibers in in vivo applications where noise constraints had previously made such applications more difficult.

The rotary junction as described herein preferably has reduced crosstalk compared to other previously known multi-channel rotary junctions. In some embodiments, the reduced crosstalk means that the optical crosstalk between the second fiber and the fourth fiber is less than −50 dB, less than −60 dB, or less than −70 dB, or more. This can be measured, for example, by illuminating fiber 12 and measuring the output power from fiber 22 (at side of 38 in FIG. 3) and from fiber 28 (at side of 42) where probe 36 is not present. Crosstalk in this instance is defined as the output from fiber 28 over the output from fiber $22 \times 10^{-6}$, or −60 dB.

Examples of sources for the applications using the multi-channel rotary junction include, but are not limited to, light-emitting diodes, super-luminescent diodes, rare-earth doped fibers, solid-state mode-locked lasers, spectrally broadened laser sources, wavelength tunable light sources, swept source, monochromatic light, polychromatic light, and the like. The source does not need to illuminate all wavelengths simultaneously. It can emit a monochromatic radiation whose wavelength is scanned with time. Additionally, other sources of energy can be used, including, but not limited to, infrared, ultraviolet, ultrasonic, low or high energy radiation (for example, x-ray, alpha, beta, gamma, and the like), other electromagnetic radiation, combinations of all of the foregoing and the like. For higher energy radiation, certain of the components of the present invention may need to be adapted for greater shielding or other functional characteristics.

Fibers and Fabrication

The first, second, third, and fourth waveguides may each independently be (i) a single mode waveguide, (ii) a multi-mode waveguide, (iii) a multi-clad waveguide, or (iv) a waveguide within a waveguide bundle. In some embodiments, some or all of the waveguides are optical fibers. In some embodiments, a polarization maintaining fiber or photonic crystal fiber may be used. One particularly useful configuration using SM illumination and MM detection in for a spectrally encoded device is: 12/18-single mode fiber and 22/28-multimode fiber. In some embodiments, one or more of the waveguides is a rigid waveguide.

The multi-channel rotary junction may be configured as having a single type of fiber or may have a mixed fiber configuration. There may be 2, 3, 4, 5, 6, or more channels in the multi-channel approach. The upper limit to the number of channels is the co-location of the waveguides in the coupling optics.

In fabrication, the second coupling optic must have a passageway there through for the second waveguide. The hole should be big enough to have the waveguide 18 in it. If the second waveguide 18 is an fiber, the hole should be at least as big as its clad. For several embodiments, the typical clad size is 125 um in diameter, but it depends on fiber.

In some embodiments, a tubing, either stationary or rotating together with (rigid or flexible) is located around the fiber. This tubing can help keep the fiber undamaged and prevent binding or other issues arising from the rotation. Exemplary tubing includes a polymer coating on the fiber, stainless hypotubing and polyimide tubing.

The collimating and coupling optics as described herein may include an individual or combination of collimating or coupling optics. For example the collimation and coupling optics can be, for example lenses, such as GRIN lenses, aspheric lenses, ball lenses, and curved mirrors.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

As used herein, the term "negligible" when used to refer to optical crosstalk means the absence of significant crosstalk. Significant crosstalk is the level of crosstalk that would increase the noise in the signal by comparable amount of signal. The crosstalk may be negligible over a broad wavelength range but, in some embodiments, is preferably negligible within the range of 400 nm to 900 nm.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A rotary junction comprising:
    a first coupling optic that comprises
        a first rotor having a stationary side and a rotating side,
        a first waveguide on a stationary side of the first rotor and,
        a second waveguide on the rotating side of the first rotor;
    a second coupling optic that comprises
        a second rotor having a stationary side and a rotating side,
        a third waveguide on a rotating side of the second rotor and,
        a fourth waveguide on the stationary side of the second rotor;
    wherein the second waveguide passes through the second coupling optics, wherein the first waveguide is configured to be coupled to one or more light sources.

2. The rotary junction of claim 1, wherein the rotation of the second waveguide is not altered or affected by the second coupling optic.

3. The rotary junction of claim 1, wherein the rotation of the first coupling optic and the rotation of the second coupling optic are synchronized.

4. The rotary junction of claim 1, wherein the first, second, third, and fourth waveguides are each optical fibers.

5. The rotary junction of claim 4, wherein the first waveguide and the second waveguide are single mode fibers.

6. The rotary junction of claim 4, wherein the third waveguide and the fourth waveguide are single mode fibers.

7. The rotary junction of claim 4, wherein the third waveguide and the fourth waveguide are multimode fibers.

8. The rotary junction of claim 4, wherein the optical crosstalk between the second waveguide and the third waveguide is less than −60 dB.

9. The rotary junction of claim 8, wherein the optical crosstalk between the second waveguide and the third waveguide is not significant within the range of 400 nm to 900 nm.

10. The rotary junction of claim 1, wherein the first coupling optic and the second coupling optic both comprise a collimator.

11. The rotary junction of claim 10, wherein the collimator for the first coupling optic is a GRIN lens and the collimator for the second coupling optic is a GRIN lens.

12. An imaging apparatus comprising: a rotary junction member comprising
    a first coupling optic that comprises
        a first rotor having a stationary side and a rotating side,
        a first waveguide on a stationary side of the first rotor and,
        a second waveguide on the rotating side of the first rotor; and
    a second coupling optic that comprises
        a second rotor having a stationary side and a rotating side,
        a third waveguide on a rotating side of the second rotor and,
        a fourth waveguide on the stationary side of the second rotor;
    wherein the second waveguide passes through the second coupling optics, and an optical probe detachably attached to the rotary junction member wherein the first waveguide is configured to be coupled to one or more light sources.

13. The imaging apparatus of claim 12, wherein the optical probe is adapted and configured for in vivo use.

14. The imaging apparatus of claim 12, wherein the rotation of the second waveguide is not altered or affected by the second coupling optic.

15. The imaging apparatus of claim 12, wherein the rotation of the first coupling optic and the rotation of the second coupling optic are synchronized.

16. The imaging apparatus of claim 12, wherein the first, second, third, and fourth waveguides are each optical fibers.

17. The imaging apparatus of claim 12, wherein the first coupling optic and the second coupling optic both comprise a collimator.

18. The imaging apparatus of claim 17, wherein the collimator for the first coupling optic is a GRIN lens and the collimator for the second coupling optic is a GRIN lens.

19. The rotary junction of claim 1, wherein the fourth waveguide is configured to be coupled to one or more detectors.

20. The imaging apparatus of claim 12, wherein the fourth waveguide is configured to be coupled to one or more detectors.

* * * * *